FREQUENCY DOUBLING CIRCUIT

Filed Jan. 29, 1954

INVENTOR
WILLIAM MIEHLE
BY
Laurence R. Brown
ATTORNEY

United States Patent Office

2,858,525

Patented Oct. 28, 1958

2,858,525

FREQUENCY DOUBLING CIRCUIT

William Miehle, Havertown, Pa., assignor to Burroughs Corporation, Detroit, Mich., a corporation of Michigan Application January 29, 1954, Serial No. 407,088

2 Claims. (Cl. 340—174)

This invention relates to circuits for modifying waveforms and in particular it relates to static permanent magnetic circuits for performing variable logical functions.

Static magnetic elements for providing bistable state operations from two different permanent magnetic remanence conditions are known in the prior art, as indicated by publications such as the A. Wang article "Magnetic triggers" published in the June 1950 issue of the Proceedings of the I. R. E. These elements basically consist of a core of magnetic material which has properties imparting magnetic remanence. A saturating flux source, generally produced by a coil wound about the core, can magnetize the core in either north or south polarity. When a core is in one state of magnetic remanence and this state is reversed by current flowing through a winding, appreciable impedance is presented by the core to the current flow, resulting in induction of an appreciable voltage in an output winding on the core. Conversely, when the initial state of magnetic remanence is such that the current in one coil does not change the remanence polarity, very little impedance is presented by the circuit and therefore little voltage is induced. Accordingly, the static magnetic element is a magnetic flip flop circuit which has two stable conditions and only provides an output signal when the circuit is changed from one stable state to another.

In modifying waveforms, for use for example in computer circuits, a variety of logical steps or functions are desired which differ substantially from the bistable state of operation inherent in prior art static magnetic elements. It is desired, for example, to use the device as a gate or "and" circuit. This type of circuit is also known as a coincidence circuit where two or more signals must arrive in conjunction to afford an output signal. To provide such operation from the flip flop type of static magnetic element, it is necessary to apply coincidence signals of half amplitude to set the circuit in one condition and to apply a reset signal before another coincidence operation takes place. Not only is further circuitry required to provide reset signals and clipping when standard amplitude waveforms are provided but computation speeds may be cut down because of the necessity of additional operational steps.

Static magnetic elements are connected in cascade in many circuit applications. Since the input circuit generally represents a low impedance, appreciable loading is presented to the signal source, which therefore in addition to supplying the energy for changing the magnetic remanence state must also supply the energy for the utilization circuit. Because of this requirement for a large amount of signal power, the use of such elements in waveform modifying circuits is restricted.

It is desirable in electronic computer work to provide a variable logical element which is capable of performing several different types of logic. For example, in a coincidence circuit a logical function of $E_0 \leftrightarrows A \cdot B \cdot C$ is performed where the output voltage is provided if and only if A and B and C are present simultaneously. When a variable logical element is available the coincidence function could also be used to provide the logic $E_0 \leftrightarrows A \cdot B \vee B \cdot C \vee A \cdot C$ where the output signal is available only if A and B or B and C or A and C coincide.

In addition to the logical functions it is desirable to have a device and associated circuitry which may be utilized for differentiation of signals, frequency multiplication and other functions generally encountered in electronic computer circuits such as pulse sharpening, delay or unistable state operation.

It is therefore a general object of the present invention to provide static magnetic elements and circuits useful in solving the various aforementioned problems.

It is a more specific object of the invention to provide high speed static magnetic element coincidence circuits which do not require an external reset signal.

It is another object of the invention to provide static magnetic circuits which derive output power from a source external to the input or read-in signal thereby requiring little driving power.

A further object of the invention is to provide a static magnetic element operable to perform various logical functions.

Various other more specific objects of the invention are to provide waveform differentiation, frequency doubling, unistable state operation, pulse sharpening, and delay circuit operation with a single static magnetic element.

Other objects and features of advantage of the invention will be found throughout the following detailed description of the invention, which illustrates different aspects and modes of operation thereof. For more readily understanding the nature of the invention the following description may be compared with the accompanying drawing, in which.

Figure 1:
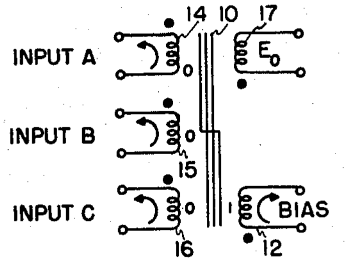
Fig. 1 is a schematic representation of a static magnetic element circuit constructed in accordance with the invention.

Referring now in particular to Fig. 1 of the drawing, the magnetic core 10 schematically indicates a material having properties imparting magnetic remanence of one of two polarities in response to a corresponding polarity of saturating flux applied to the core. In accordance with the present invention, a biasing saturating flux source is provided for establishing magnetic remanence of a first polarity in the core 10 by means of current flowing in the bias winding 12. Three input windings 14, 15, 16, are provided for corresponding input signals A, B and C.

Assuming that the bias current is just sufficient to saturate the core 10 and the input signals are all of the same amplitude, two input signals arriving in coincidence and having a total amplitude equal and opposite to the biasing signal will overcome the saturating flux and establish saturation in an opposite direction thereby changing the static magnetic remanence condition of the element. Upon any change of polarity of the remanence condition a high impedance is presented by the element, and accordingly a large output signal is afforded in the output winding 17. Therefore output pulses are provided whenever the coincidence of two or more signals change the remanence condition and also at the termination of the coincidence of as many of the signals as necessary to permit the bias flux to automatically change the remanence polarity back to the initial state.

Figure 2:
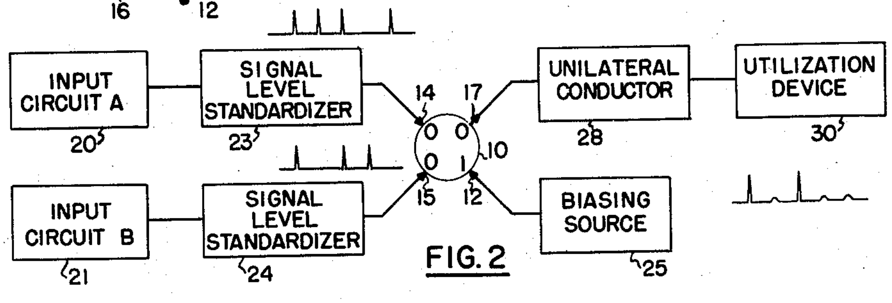
Fig. 2 is a block diagram of a coincidence circuit constructed in accordance with the invention.

The block diagram of Fig. 2 illustrates a circuit for gating or providing an output signal upon coincidence of two input signals A and B from the respective input circuits 20 and 21. In order to properly overcome the bias it is important that the input signals are of substantially the same amplitude. Accordingly, signal level standardizers 23 and 24 are provided, if necessary. The magnetic element is here schematically designated as the ring 10 with input windings 14 and 15, the bias winding 12 and the output winding 17. In this diagrammatic representation, the legends "1" and "0" indicate input signals of opposite polarity and equal amplitude. Thus a "1" bias signal causes the core 10 to go into one remanence condition, whereas two "0" signals simultaneously will cause the bias flux to be overcome and cause the core to change to the opposite remanence condition. The bias source 25 will, in most respects, be a constant current or voltage supply for maintaining the core in one stable state of remanence.

Since the output circuit of terminal 17 is responsive to a change in the remanence condition of the core, an ouput pulse will be provided when both the input signals initially coincide, and also when both input signals terminate to restore the remanence to its initial condition. These output pulses are of opposite polarity. Accordingly, the unilateral conductor 28 is provided when signals of only one polarity "0" are required by the load circuit 30.

The bias method hereinbefore described theoretically allows any number of input pulses to be set for coincidence by increasing the bias until $n$ input pulses will reverse the core but $n-1$ will not. For large $n$'s, however, the signal level standard would be too stringent for usual application because of the small amount of tolerance between $n$ and $n-1$ which must be used to prevent erratic operation. It is to be emphasized that in this circuit, if standard amplitude pulses are to be used, the input pulses may be used in full amplitude when the bias flux source level is appropriately set. Should an unbiased circuit however be used, fractional strength pulses would necessarily be applied, thereby necessitating additional amplitude level setting or clipping circuits.

Figure 3:
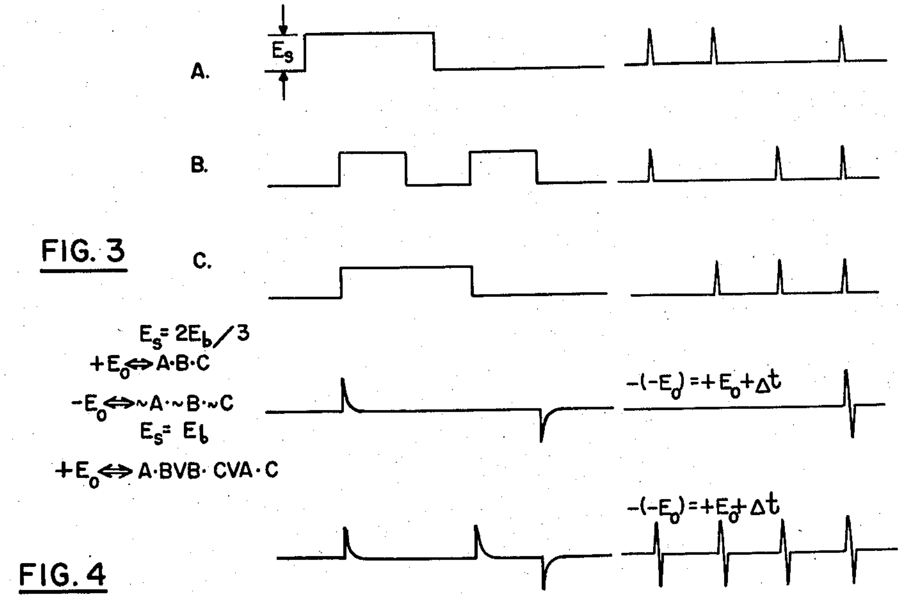
Figs. 3 and 4 are waveform diagrams illustrating operational features of the invention.

Logic which may be performed by a circuit having three input signals A, B and C is exemplified in the several waveforms of Fig. 3 which illustrates operation with both square wave and momentary impulse type signals. It is to be noted that when the signal $E_s$ has an amplitude equal to ⅔ $E_b$, $E_b$ being the bias amplitude, the state of remanence is reversed thereby supplying an arbitrarily designated positive output signal $E_0$ if and only if A and B and C coincide. Other logic is performed by the negative output signals when square waveform signals are used since a condition $-E_0$ exists if and only if neither A, B nor C is present or logically speaking the condition not A ($\sim$A) and not B ($\sim$B) and not C ($\sim$C) exists. This is true when the bias source is just sufficient to cause saturation of the winding. Further types of logic for the negative and positive signals can be provided by increasing the bias beyond saturation so that the $-E_0$ is present when say only two signals terminate. When the three inputs are provided using a square wave signal voltage $E_s$ equal in amplitude to $E_b$, the logic is $$+E_0 \rightleftharpoons A \cdot B \vee B \cdot C \vee A \cdot C$$

So far the logic has applied to variable width input pulses. With momentary type input pulses, the bias returns the core to its original state immediately after coincidence and the $-(-E_0)$ signal equals the $+E_0$ signal except for a time delay about equal to the width of the input pulses. From a consideration of the foregoing waveform analysis it is seen that the biased static magnetic element of this invention may be utilized for various types of computer logic.

Figure 4:
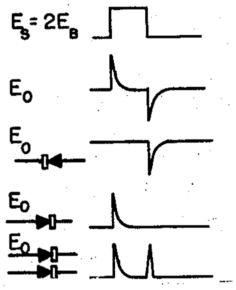

Consider a single input pulse $E_s$ equal to $2E_b$, such as shown in Fig. 4, with $E_s$ having considerable width. The output pulse $E_0$ without rectification illustrates the operation of the magnetic element as a differentiating circuit. By utilizing rectifiers of opposite polarities in the output circuit, one or the other polarity of output pulse may be selected. A full wave rectifier converts both output pulses to the same polarity.

Figure 5:
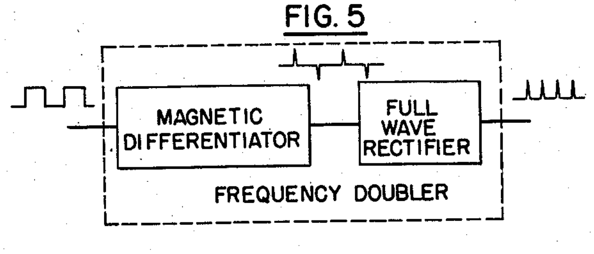
Figs. 5 and 6 are respectively block and schematic diagrams of a frequency doubler circuit embodying the invention.
Figure 6:
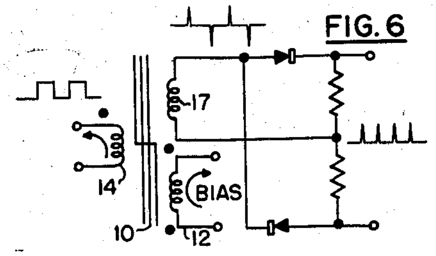

It follows therefore in Fig. 5 that the combination of a static magnetic element utilized as a differentiator circuit in combination with a full wave rectifier will afford frequency multiplication. A more specific schematic circuit of this is shown in Fig. 6.

Reconsidering the circuit of Fig. 1 and recalling the requirement for low signal power, assume a rectifier in the output circuit to provide the arbitrarily designated negative output signal $E_0$ of Fig. 4 which occurs when the bias reverts the circuit to its initial remanence condition at the termination of the input signal $E_s$. The rectifier acts as a switch to connect the load only after the input signal has terminated. Therefore, a high impedance is presented to the input signal by the load circuit, and the output pulse afforded to the load is derived from the bias source rather than the input signal. Accordingly, it is evident that low signal power is required.

Having thus described improved biased static magnetic element and its associated principles of operation for performing various logical and waveform modifying steps, it is evident that novel improvements have been offered to prior art devices. It is, therefore, desired that Letters Patent be issued for that structure believed descriptive of the nature of the invention as defined with particularity in the appended claims.

What is claimed is:

1. A frequency doubler circuit comprising in combination, a static binary magnetic element capable of assuming either of two stable conditions of magnetic remanence, a source of constant biasing flux for establishing a first remanence condition in said element, a signal source for supplying a periodic signal, means for converting said signal into a flux overcoming said biasing flux and establishing the opposite remanence condition, means responsive to changes in the remanence condition of said element for providing an output signal, and full wave rectifying means connected for rectifying said output signal.

2. A frequency doubler circuit comprising a static binary magnetic element capable of assuming either of two stable conditions of magnetic remanence, means supplying said element with a biasing flux establishing therein one stable remanence condition, a source of periodic signals, means converting said signals into a flux of opposite sense to said biasing flux to thereby overcome the flux and establish an unstable remanence condition of opposite polarity, an output circuit responsive to changes in remanence conditions in said core, and full wave rectification means in said output circuit.

References Cited in the file of this patent

UNITED STATES PATENTS

| | | |
|---|---|---|
| 2,666,151 | Rajchman et al. | Jan. 12, 1954 |
| 2,691,155 | Rosenberg et al. | Oct. 5, 1954 |
| 2,736,880 | Forrester | Feb. 28, 1956 |

OTHER REFERENCES

Publication, Proc. of Assoc. for Comp. Mach., May 1952, pp. 223–229.